UNITED STATES PATENT OFFICE.

GEORGE W. ABELL, OF INDIANAPOLIS, INDIANA.

COMPOSITION OF MATTER FOR WALL-COVERINGS.

SPECIFICATION forming part of Letters Patent No. 462,678, dated November 10, 1891.

Application filed June 25, 1891. Serial No. 397,498. (No specimens.)

*To all whom it may concern:*

Be it known that I, GEORGE W. ABELL, a citizen of the United States, residing at Indianapolis, in the county of Marion and State of Indiana, have invented certain new and useful Improvements in Composition of Matter to be Used in Covering Walls and other Surfaces; and I do declare the following to be a full, clear, and exact description of the invention, such as will enable others skilled in the art to which it appertains to make and use the same.

My composition consists of the following ingredients, in combination substantially as follows, viz: I combine by mixing or mingling, dry, five hundred to one thousand pounds of lime, fifty to five hundred pounds of linseed (oil-cake) meal, twenty-five to two hundred pounds of white lead, ten to fifty pounds of litharge, and ten to two hundred pounds of sugar.

I use to produce the required plaster, according to the surface to be covered, from five to one hundred pounds of the above mixture with four hundred pounds of calcined gypsum and six hundred to one thousand pounds of sand. Mingle thoroughly, add enough water, and mix to consistency required. Of these ingredients the white lead and sugar give hardness, tenacity, and adhesion. Litharge and linseed (oil-cake) meal give plasticity, improve the working qualities, and prevent cracking in drying. Lime develops the adhesive and mucilaginous properties of the mass, saponifies the oil in the meal, and gives union to the qualities of the lead, sugar, litharge, and meal, which, as a whole, act as a retarder in union with calcined gypsum, sand, and water. Plaster produced by the combination of these ingredients will be of superior hardness, finish, and cheapness, and the time of setting will be under the control of the operator.

I am aware that calcined gypsum, lime, sand, and water have been used in making plaster. I am aware, also, that linseed (oil-cake) meal is one of the ingredients covered by Patent No. 445,815, dated February 3, 1891, which was issued to Ansel Moffatt.

What I claim, and desire to secure by Letters Patent of the United States, is—

The herein-described composition of matter to be used for covering walls and other surfaces, consisting of white lead, litharge, sugar, linseed (oil-cake) meal, lime, calcined gypsum, sand, and water in proportion and union, as specified.

In testimony whereof I affix my signature in presence of two witnesses.

GEORGE W. ABELL.

Witnesses:
J. T. LECKLIDER,
L. SMYTHE.